Sept. 11, 1956  R. C. FOXCROFT  2,762,933
ELECTRIC SWITCH GEAR FOR THE AUTOMATIC STARTING
OF INTERNAL COMBUSTION ENGINES
Filed March 29, 1954

INVENTOR
Raymond C. Foxcroft
By Watson, Cole, Grindle & Watson
ATTORNEYS

United States Patent Office 2,762,933
Patented Sept. 11, 1956

2,762,933

ELECTRIC SWITCH GEAR FOR THE AUTOMATIC STARTING OF INTERNAL COMBUSTION ENGINES

Raymond Cyril Foxcroft, Discovery, Transvaal, Union of South Africa

Application March 29, 1954, Serial No. 419,514

Claims priority, application Union of South Africa April 2, 1953

5 Claims. (Cl. 290—30)

This invention relates to the automatic starting of internal combustion engines and in particular to the switch gear for starting engines used for domestic lighting.

The object of this invention is to provide an improved switch gear for automatically starting up diesel engines whenever a demand is made for power.

A lighting circuit in which the switch gear according to this invention is embodied, comprises a diesel engine driving an electric generator wired so that it may be used as an electric motor to turn the engine, an independent source of electric power such as a battery and connections from the sources of electric supply through the switch to the circuit requiring power.

The electric circuit according to this invention embodies an electric generator driven by a diesel engine, a switch gear incorporating an independent D. C. electric motor, a plurality of switches operated by mechanism turned by said motor, a contactor with a number of bridging members connecting circuits controlled by said switches to pass current which energise solenoids in sequence to start the engine, run it, shut it down and leave it in condition for subsequent starting.

The invention provides also for the independent motor to be in the form of a reciprocating or pulsating motor, operating to turn a cam shaft adapted to operate switches for passing the current to energize the solenoids. The invention further provides for the independent motor to drive the cam shaft through a pawl and ratchet mechanism.

A preferred form of circuit and switch gear according to this invention, suitable for use in a domestic lighting system, is illustrated in the accompanying drawing in which.

The circuit illustrated is one preferred form embodying the invention and is suitable for use in a domestic lighting system, wherein the switching on of even one light will bring into operation the diesel engine to generate power. The system incorporates a switch gear and an electric accumulator, dry battery or other independent source of "stand by" power, hereinafter referred to as a battery. The said switch gear also incorporates an independent electric motor, preferably of the reciprocating type for example similar to a motor used for operating the windscreen wiper of a motor car. When the engine is shut down the independent motor and battery are connected in the domestic lighting circuit and as soon as a switch is closed to complete the circuit the independent motor is started.

While a windscreen wiper motor is mentioned above as suitable, any swinging, pulsating, or reciprocating motor capable of operating a pawl and ratchet mechanism may be used.

Figure 1:
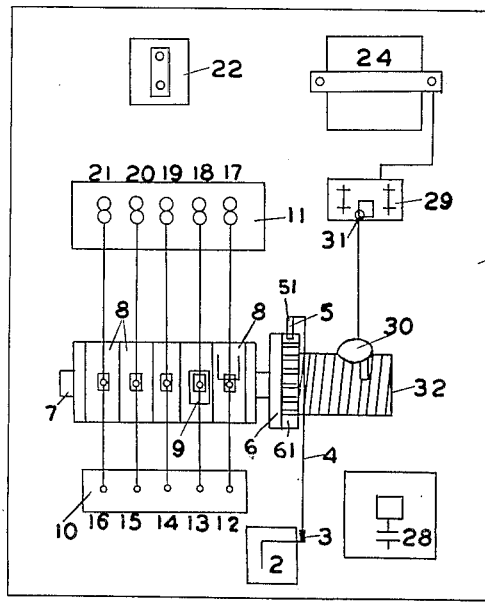
Fig. 1 is a schematic plan view of the switch gear.

In Fig. 1 of the drawing the various parts making up the switch gear are shown as mounted on a panel 1. A motor 2 has a cranked axle 3 connected through a pitman 4 to an arm 5 which will turn, through a pawl and ratchet mechanism, the drum 6, step by step, with each reciprocation of the cranked arm 5. The drum 6 is attached to a shaft 7. Shaft 7 carries five discs 8 which have cams 9 on their circumferences and are of well known form.

A fixed platform 10, above the rotating cams 9 carries resilient electrically connected fingers 12, 13, 14, 15, 16. The fingers on platform 10 are connected to the various units in the switch circuit while platform 11 carries the contacts 17, 18, 19, 20, 21 to complete, with the fingers above mentioned, the connections as required. The cams 9 lift and lower the fingers to break and make the necessary connections between said fingers 12—16 and points 17—21. The cams 9 on the rotating discs 8 are so positioned that they will lower and raise the fingers in the sequence required and as hereafter described.

22 indicates the solenoid in a starting switch 23. With the panel 1 mounted vertically the switch 23 will normally be opened by gravity.

24 indicates a contactor comprising an assembly of three bridging members 25, 26, 27.

28 indicates a switch which is normally closed under gravity but is set to open when current is passing through the circuit, as described later.

A switch 29 weighted at 30 is adapted to be swung about pivot 31 to limit the number of times the motor 2 is allowed to operate, and the cam shaft 7 rotate, in an attempt to start the engine, before the current is cut off and the switch gear immobilised to await proper attention. A spiral path 32 cut on shaft 7 acts to position the switch 29.

A battery 33 provides a stand-by supply of electric current, and 34 represents an A. C. generator which is wired so that it may function as a D. C. motor, when connected to the battery 33, to turn the diesel engine 35.

Solenoids 36 and 37 control the fuel supply to and decompression means on the engine 35, respectively.

When the generator 34 is operating the finger 15 will have made connection with contact 20, this will allow A. C. current to be taken from the slip ring 38 and passed through solenoid 39 of the contactor 24 to move the bridging members 25, 26, 27 to the positions shown by the dotted lines. Now through contactor 24 the generator 34 will be connected to supply current to the power line through the terminals 40, 41. 42 represents a load, which may be a lamp, in the power line.

In describing the operation of the switch gear it is assumed that the whole lighting circuit has been running but has shut down automatically when no load was on the circuit. The circuit will be left with finger 16 in contact with point 21 and with all other fingers off their contacts 17, 18, 19, 20. The bridging members in the contactor 24 will be in their original positions.

If now a lamp 42 in the loop between terminals 40 and 41 is switched on, a circuit is closed so that the current flows from the battery 33 through the bus bar 43, bridging member 27, solenoid 22, and terminals 41, 40 to earth. The current flowing through solenoid 22 closes switch 23 allowing current to pass from bus bar 43 through bridging member 26, to independent motor 2. The motor 2 turns shaft 7, allowing finger 12 to connect with contact 17. This enables current to pass from battery 33 through the switch 28 to the motor 2.

The motor 2 is now connected to the battery 33 through two paths, the path through switch 28 being the one which offers least resistance to the current flow.

Figure 2:
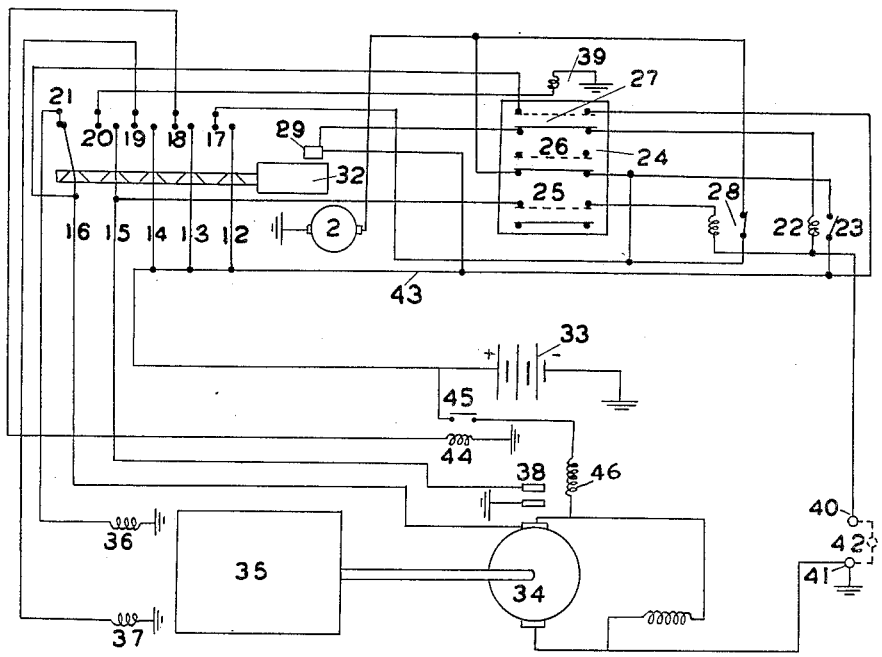
Fig. 2 is a wiring diagram of the circuit embodying the switch gear shown in Fig. 1.

The reciprocating motor 2 through ratchet 6 continues to turn the shaft 7 which moves the cams 9. The cams 9 are so arranged that contact 17 is kept connected in circuit while the following contacts 18, 19 and 20 are connected in sequence. The motor 2 continuing to drive shaft 7 through the pawl 5 and ratchet 6 brings the cam 9 in position to bring the finger 13 to connect with contact 18. This connects the battery 33 through the series field coil 46 of the generator 34 so that it operates as a motor. This is done, as shown in Fig. 2, by energising a solenoid 44, which closes switch 45. The engine 35 is thus turned and keeps revolving while the motor 2 turns the cam shaft 7 so that finger 14 is connected to contact 19. This connection passes current to the solenoid 37 which acts to operate means so that compression takes place on the engine 35. Normally the engine 35 is under decompression but the current through solenoid 37 will act to allow compression to take place while the circuit is supplied with current. When, however, the engine 35 is shut down, as hereafter described, the solenoid 37 will allow, through the release of a spring or otherwise, for decompression of the engine 35 to be effective once more.

The engine 35 is now turning and the generator 34 functioning so that there is alternating current in the slip rings 38. At this time with the motor 2 continuing to operate, the connection between finger 13 and contact 18 will be broken and connection between finger 15 and contact 20 will be made. Finger 15 is connected to the slip ring 38 of the generator 34. Contact 20 is connected to the solenoid 39 of the contactor 24 and at once the bridging members 25, 26 and 27 take the positions indicated by the dotted lines. Finger 16 is connected to the exciter portion of the generator 34 and as soon as the bridging member 27 has been raised to the position shown in the dotted lines, D. C. current will flow to charge the battery. The bridging member 26 breaks contact with the motor 2 and with switch 23 so that connection to bus bar 43 is broken and the motor 2 is stopped.

When contactor 24 is energised as above described it mechanically disconnects the switch 29 from the spiral path 32 so that the weight 30 allows it to pivot about 31 and it comes to rest in a position to restart along path 32 when contactor 24 is no longer energised. If the sequence of operations fails to make contactor 24 function the switch 29 will not break the current to solenoid 22 and the operations for starting the engine 35 will be repeated by motor 2 until the spiral path 32 carries the weight 30 over so far that the switch 29 is opened and the motor 2 stops. Some special action must now be taken to reset the circuit.

With the switch gear acting normally, the bridging member 25 connects slip ring 38 through finger 15 with the solenoid 28 which will act to break the connection between the bus-bar 43 and the motor 2. The line terminals 40 and 41 will be connected directly to the generator 34.

The engine 35 is now running and any load through the terminals 40 and 41 is taken by the generator 34.

It is next assumed that the load is removed and no further current is required from the generator 34. The solenoid for switch 28 will accordingly no longer be energised and the switch 28 automatically falls and again connects the battery 33 to the circuit of motor 2 through the finger 12 and contact 17. The motor 2 starts and operates to break contact between finger 15 and contact 20. This breaks the connection to solenoid 39 and allows the contactor 24 to move the bridges 25, 26, 27 into their original positions. The motor 2 continues to operate due to the current from battery 33 passing thereto through finger 12 and contact 17, through switch 28. Again a parallel path for the current to the motor 2 is provided through bridging member 26 by way of switch 23, contact 17 and finger 12 connected to bus-bar 43. The motor 2 now turns shaft 7 so that finger 16 makes contact with 21. This cuts the fuel from the engine 35 by connecting the solenoid 36 with the D. C. current supply from the exciter portion of the generator 34 and the engine stops.

The motor 2 remains connected and rotates to disconnect fingers 14 with contact 19 and this breaks the circuit to solenoid 37 which automatically brings about decompression in engine 35 leaving it in a position to be rotated by generator 34. The motor 2 continues to rotate shaft 7 until finger 12 is disconnected from 17, leaving only finger 16 and its contact 21 connected. This leaves the switch gear ready for the starting cycle to be repeated.

What I claim as new and desire to secure by Letters Patent is:

1. An electric lighting plant comprising a diesel engine, an electric generator mechanically connected thereto, a field coil for said generator, output supply terminals connected to the generator, a switch gear comprising a plurality of switches, an independent motor and battery connected through said switch gear to said supply terminals, a pawl and ratchet mechanism mechanically connected to said independent motor, a cam shaft rotated by said pawl and ratchet mechanism, means electrically operated through the switch gear for decompressing the diesel engine, and a member operated by said independent motor to close the switches in the switch gear in sequence, to operate the means for decompressing the engine, to connect the battery to the generator field coil, to disconnect the means for decompressing the engine, to disconnect the battery from the generator field coil, and to disconnect the independent motor.

2. An electric lighting plant comprising a diesel engine, an electric generator mechanically connected thereto, a field coil for said generator, output supply terminals connected to the generator, a switch gear comprising a plurality of switches, an independent motor and battery connected through said switch gear to said supply terminals, a pawl and ratchet mechanism mechanically connected to said independent motor, a cam shaft rotated by said pawl and ratchet mechanism, a spiral path on said cam shaft, a weighted switch moved by said spiral path, a connection between the battery and independent motor controlled by said weighted switch, a pivot for the switch within the length of said path, means electrically operated through the switch gear for decompressing the diesel engine and a member operated by said independent motor to close the switches in the switch gear in sequence, to operate the means for decompressing the engine, to connect the battery to the generator field coil, to disconnect the means for decompressing the engine, to disconnect the battery from the generator field coil, and to disconnect the independent motor.

3. An electric lighting plant as claimed in claim 1, providing cams on the cam shaft, fingers adapted to be moved by said cams, contacts located to be reached by said fingers, electrical connections to said fingers and contacts.

4. An electric lighting plant as claimed in claim 2 in which the generator is an A. C. machine.

5. An electric lighting plan comprising a diesel engine, an electric generator mechanically connected thereto, a field coil for said generator, output supply terminals connected to the generator, a switch gear comprising a plurality of switches, an independent motor and battery connected through said switch gear to said supply terminals, means including an alternating current operated contactor electrically operated through the switch gear for decompressing the diesel engine, and a member operated by said independent motor, to close the switches in the switch gear in sequence, to operate the means for decompressing the engine, to connect the battery to the generator field coil, to disconnect the means for decompressing the engine, to disconnect the battery from the generator field coil, and to disconnect the independent motor.

(References on following page)

References Cited in the file of this patent

UNITED STATES PATENTS

| | | |
|---|---|---|
| 1,202,622 | Van Horn | Oct. 24, 1916 |
| 1,470,948 | Van Horn | Oct. 16, 1923 |
| 1,650,524 | Kettering | Nov. 22, 1927 |
| 1,706,119 | Jones | Mar. 16, 1929 |
| 1,866,494 | Strong | July 5, 1932 |
| 1,981,859 | Frese | Nov. 27, 1934 |
| 2,006,523 | Strong | July 2, 1935 |
| 2,006,524 | Strong | July 2, 1935 |